(12) United States Patent
Napierala

(10) Patent No.: US 10,056,013 B1
(45) Date of Patent: Aug. 21, 2018

(54) TWO-PART LABEL WITH REMOVABLE STRIP

(71) Applicant: True Label, Inc., Toledo, OH (US)

(72) Inventor: Robert E. Napierala, Sylvania, OH (US)

(*) Notice: Subject to any disclaimer, the term of this patent is extended or adjusted under 35 U.S.C. 154(b) by 0 days.

(21) Appl. No.: 15/409,013

(22) Filed: Jan. 18, 2017

Related U.S. Application Data

(60) Provisional application No. 62/279,916, filed on Jan. 18, 2016.

(51) Int. Cl.
    *G09F 3/10*     (2006.01)
    *B32B 7/12*     (2006.01)
    *G09F 3/02*     (2006.01)

(52) U.S. Cl.
    CPC .............. *G09F 3/10* (2013.01); *B32B 7/12* (2013.01); *G09F 3/02* (2013.01); *B32B 2519/00* (2013.01); *G09F 2003/0222* (2013.01); *G09F 2003/0229* (2013.01)

(58) Field of Classification Search
    CPC ....... G06K 17/0029; G06K 2017/0048; G06K 2017/0045; G09F 3/0288; G09F 3/02; G09F 3/10; G09F 3/0225; G09F 2003/022; G09F 2003/0229; B42D 15/006; B42D 15/00; B65C 9/1884; Y10S 283/901; Y10S 283/90; Y10T 428/15; Y10T 428/1495; Y10T 428/14; Y10T 428/149; Y10T 428/1476
    See application file for complete search history.

(56) References Cited

U.S. PATENT DOCUMENTS

| | | | | |
|---|---|---|---|---|
| 4,995,642 A * | 2/1991 | Juszak | ................ | B42D 15/006 283/105 |
| 5,484,168 A * | 1/1996 | Chigot | ................ | B42D 15/006 283/103 |
| 7,758,080 B1 * | 7/2010 | Vidler | ................... | B42D 15/00 283/81 |
| 8,507,065 B2 * | 8/2013 | Milson | ................. | B65C 9/1884 428/40.1 |

* cited by examiner

*Primary Examiner* — Patricia L. Nordmeyer
(74) *Attorney, Agent, or Firm* — MacMillan, Sobanski & Todd, LLC

(57) ABSTRACT

A two-part label roll includes a liner and labels with removable strips. The liner is cut under the removable strip to allow a portion of the liner to remain with the label as it is removed from the liner and applied to a package. The liner may be cut in sections to leave liner ties to connect the opposing cut edges of the liner portion. The removable strip may be elongated and extend transverse to the side edges of the liner roll and the cut portion having a non-linear leading edge to facilitate label application with automated equipment.

5 Claims, 5 Drawing Sheets

TWO-PART LABEL WITH REMOVABLE STRIP

REFERENCE TO RELATED APPLICATION

This application claims priority from U.S. Provisional Application Ser. No. 62/279,916, filed Jan. 18, 2016, the disclosures of which are hereby incorporated by reference.

BACKGROUND

This invention relates to labels having removable sections, such as labels used for pharmaceutical drugs with removable reorder sections.

Many labels with removable sections have three layers, namely a base silicone liner, a pressure sensitive silicone carrier liner with an adhesive backing for attachment to the base liner, and a pressure sensitive label having an adhesive back for attachment to the carrier liner. The three-part label material is commonly referred to as piggyback label material because it contains a middle layer of material that has adhesive on the bottom and a silicon release coating on the top. The carrier liner is identical in shape and size of the label and carries the label as it is applied to a surface. The piggyback labels are mass-produced, on a roll consisting of a base liner, a carrier liner and label. Typically, the carrier liner and label are removed from base liner together and applied to product packages with automated equipment. Piggyback labels are typically used when the entire label or a section of the label needs to be removed and reapplied to something else after the multi-layer, consisting of carrier liner and label, are applied to an original surface. In order for a portion of the label to be removed from the carrier liner it must include a cut or scored section that allows a section of the label to be removed from the carrier liner. In a health care application, a section of the label is typically cut during the manufacturing process so it can be used for reordering a pharmaceutical drug after the piggyback label is initially applied to a drug package for distribution. The section that is cut may be removed from the carrier liner with or without removing the remainder of the label from the carrier liner.

Three-part labels are functional but can be expensive to manufacture because of their three components. Two-part labels with removable sections also have been used, with the label attached directly to a base silicone liner. The removable sections are created by cutting both the paper label and the base liner such that a section of the liner under the removable strip remains attached to the label during the label application process while the label is removed from the base liner roll and attached to a package. This process can be performed with an automatic label application system or manually. Cutting a portion of the base liner beneath and outside of the section of the label that is desired to be removed from the package to which the label is originally applied allows the removable strip to be removed from the package easily because the liner section prevents the desired removable section of the label from adhering to the package.

There are manufacturing and equipment limitations with currently used two-part labels because of the removable section. For example, current two-part labels with removable sections cannot be removed from the liner roll and applied to a package with certain automated equipment because the cut section of the liner creates a gap or hole in the liner. The edges of the gap or hole have been know to cause the liner catch or hang-up on automatic application equipment, causing jams or breaks in the liner. Two-part labels have been used with label applying equipment which can apply labels with the removable sections extending in a longitudinal direction (parallel to the edges of the label roll) so that the "width" of the strip is only a small percentage of the total width of the liner to alleviate some equipment jams or liner breaks. However, problems remain with two-part labels with removable sections that contain a wider percentage of the total width of the liner and extend in a direction perpendicular to the roll edges of the liner when attempting to auto apply the labels with some auto application equipment.

SUMMARY OF THE INVENTION

One aspect of the present invention is a two-part liner with a removable strip, with the leading cut edge of the liner having a non-linear shape. Another aspect of the present invention is a two-part label with a removable strip wherein the liner is cut under the removable strip in sections, leaving "ties" to connect the opposing cut edges of the liner.

These features alone or together substantially alleviate equipment jams or liner breaks caused by tearing of the liner for labels with removable sections on a roll when the labels are being automatically applied by equipment.

DESCRIPTION OF PRESENTLY PREFERRED EMBODIMENTS

Figure 1:
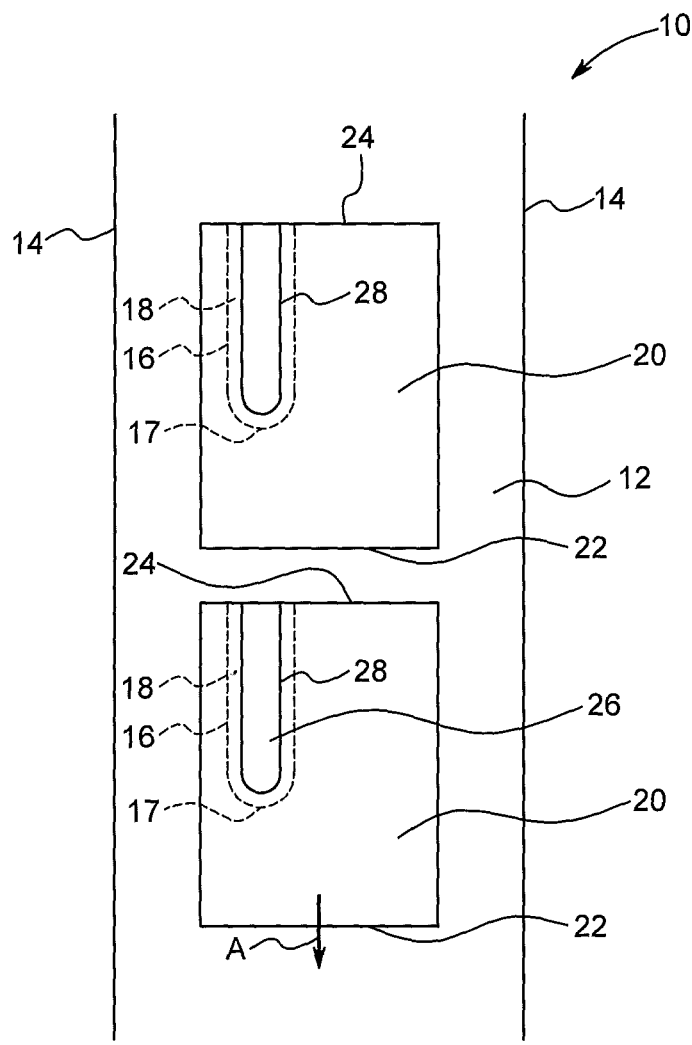
FIG. 1 is a plan view of a prior art two-part label roll.

Referring to FIG. 1, a typical two-part label roll 10 includes a base silicone liner 12 having lateral edges 14. Two-part paper labels 20 are adhered to the liner. Each label 20 has a leading edge 22 and a trailing edge 24, the leading edge 22 being peeled first from the liner 12, the peel-off or unrolling direction indicated as A. Each label 20 has a longitudinally extending removable strip 26 defined by perforations 28 to allow the strip 26 to remain attached to the label 20 until it is intentionally removed from a package to which the label is attached.

The liner 12 is cut around each removable strip 26 at cut lines 16 to create an undercut liner portion 18 which extends beyond the edges 28 of each removable strip in order to maintain the integrity of the label and undercut portion while the label is being applied to a package. When each label 20 is removed from the liner 12, the undercut portion 18 stays with the label 20. Each undercut portion 18 has a rounded or pointed leading edge 17 to alleviate equipment jams or liner breaks caused by tearing of the liner when the label is removed from the liner and applied to a package with automated equipment.

Figure 2:
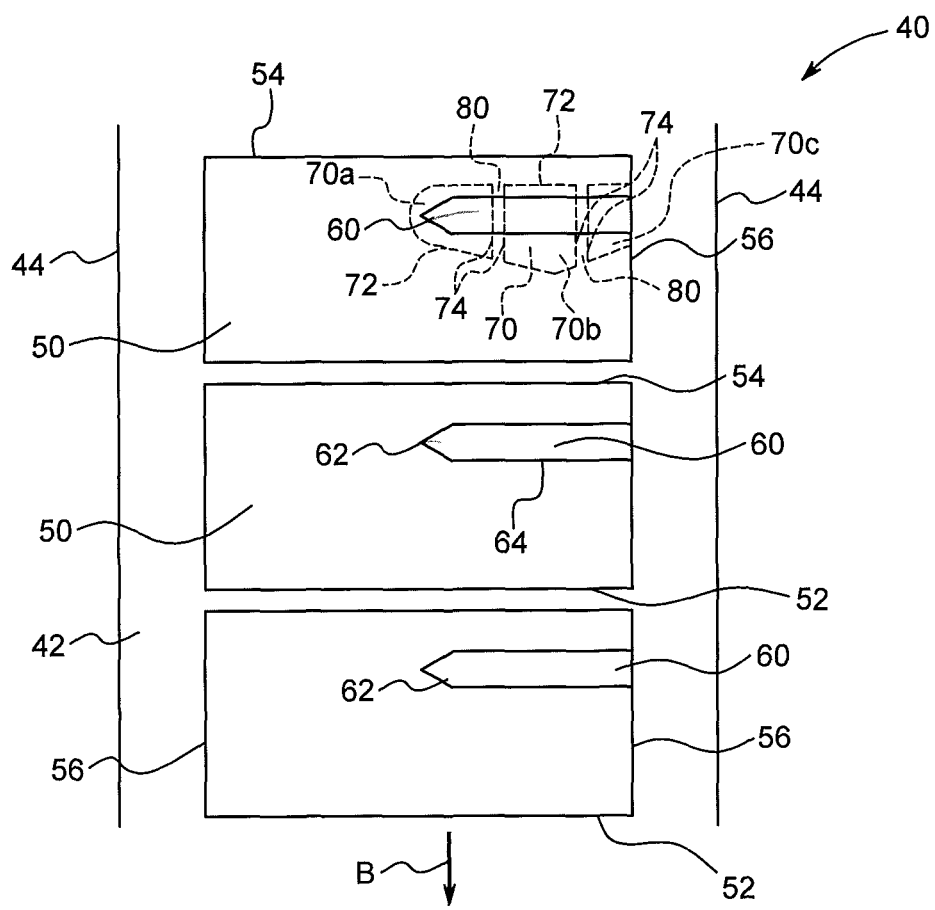
FIG. 2 is a plan view of a two-part label roll of the present invention.

Referring to FIG. 2, a two-part label roll 40 of the present invention includes a base silicone liner 42 having lateral edges 44. Two-part paper labels 50 are adhered to the liner through a pressure sensitive adhesive coated on the bottom surface of the labels 50. Each label 50 has a leading edge 52 and a trailing edge 54, the leading edge 52 being peeled first from the liner 42, the peel-off or unrolling direction indicated as B. While label shape is not critical to the present invention, in the embodiment of FIG. 2, each label 50 is generally rectangular with side edges 56.

Each label 50 has a longitudinally extending removable strip 60 extending from a side edge 56, i.e. oriented generally transversely to the liner edges 44. Each removable strip 60 has a rounded or pointed tip 62, although the tip configuration is not essential to the present invention. The removable strips 60 are defined by perforations or the like 64 in the label paper to allow easy removal after the label is adhered to a package.

The liner 42 has a peripheral cut 72 surrounding each removable strip 60 to provide an undercut liner portion 70 (only one undercut 70 is shown under one releasable strip 60 in FIG. 2) which will be removed from the liner 42 along with the label 50 when the label 50 is removed and applied to a package. The peripheral liner cuts 72 are positioned beyond the perforations 64 of each removable strip in order to maintain the integrity of the label and liner while the label is being peeled off of the liner and applied to a package. The peripheral cuts 72 extend under the label edges 56 so that the undercut portions may be cleanly removed from the liner 40.

A typical a two-part label 50 as shown in FIG. 2 could be about 4¾ inches long by about 1⅞ inches wide, with a removable strip 60 about 1½ inches long by about ⅜ inches wide. Except for the edges of the removable strips 60 which border the label edges 56, the peripheral cuts 72 are positioned to provide a surface of at least about ⅛ inches on all sides of the removable strip edge perforations 64. This provides margins around the removable strips 60 to assure that the removable strips may be easily removed without adhering to the product package to which the label 50 is applied.

Optionally, additional transverse liner cuts 74 may be made in the liner 42 extending between the peripheral boundaries of the liner portion 70 to provide liner ties 80 extending underneath the removable strips 60. Preferably, the transverse cuts 74 extend generally parallel to the liner edges 44, thereby providing liner ties 80 which similarly extend parallel to the liner edges. Of course, other orientations of the liner ties are possible. If additional transverse cuts 74 are made, the liner portion 70 will have distinct sections 70a, 70b, and 70c.

Figure 3:
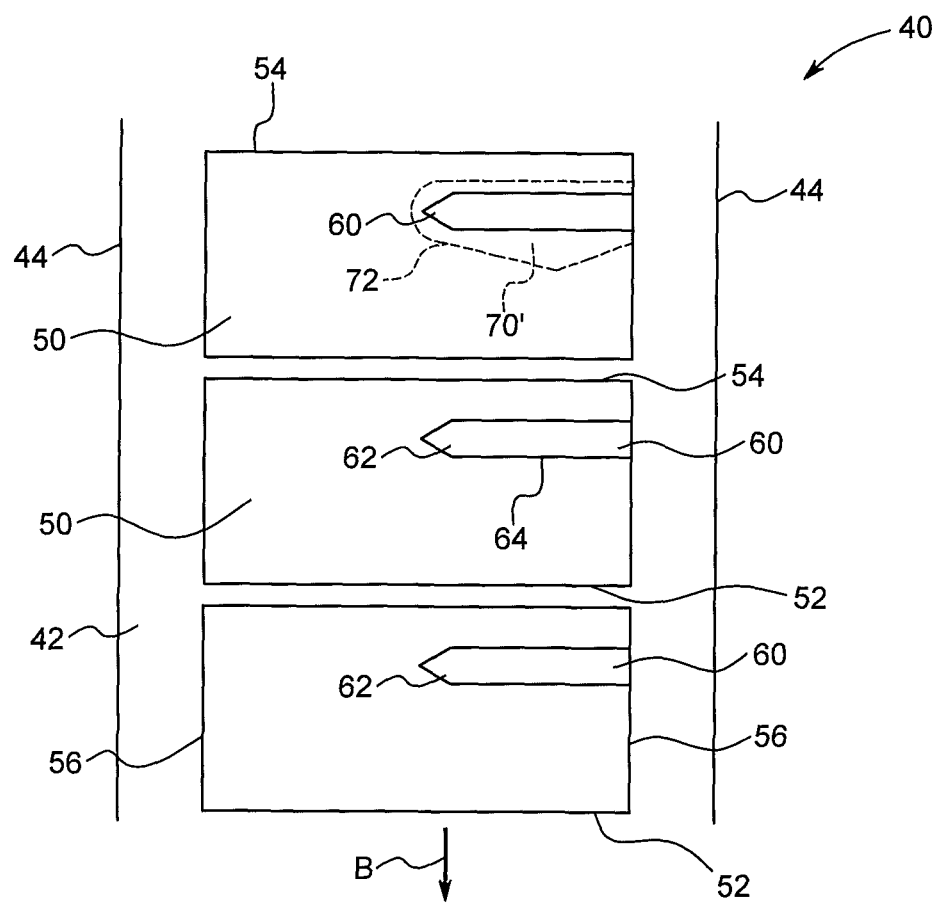
FIG. 3 is a plan view of an alternative two-part label roll of the present invention.

FIG. 3 shows the same liner 42 having the same labels 50 with alternative undercut portions 70' (only one undercut portion 70' under one releasable strip 60 is shown in FIG. 3). The undercut portions 70' have the same peripheral cut lines 72 but no transverse cut lines 74. The undercut portions 70' are therefore single pieces of liner without the separate sections 70a, 70b, and 70c of the FIG. 2 embodiment.

Figure 4:
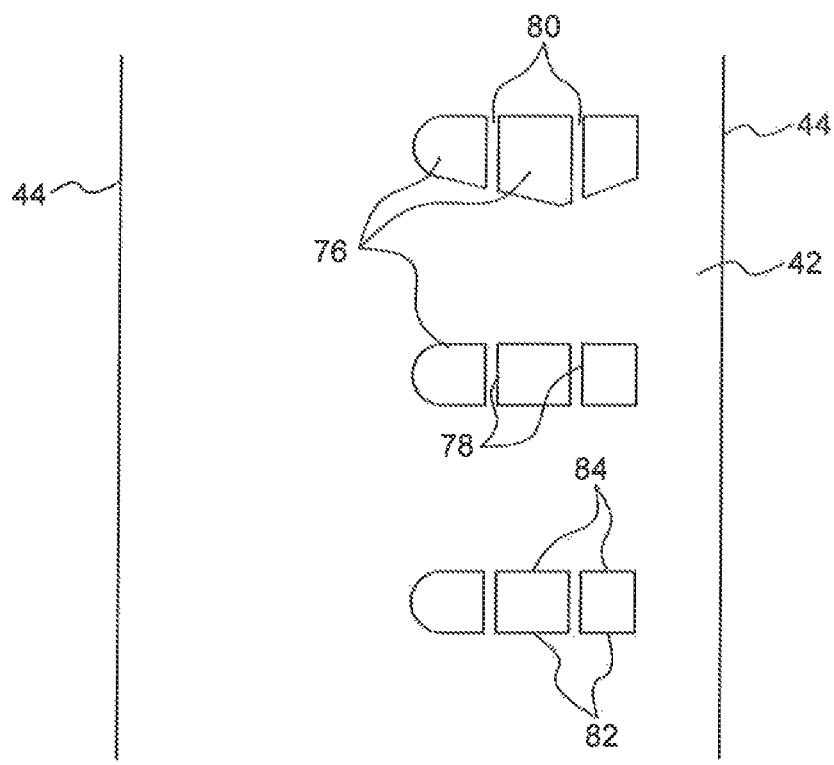
FIG. 4 is the liner of FIG. 2 after labels have been removed.

FIG. 4 shows the liner of FIG. 2 after the labels 50 have been removed. The liner 42 has three holes or voids 76 resulting from the liner cut lines 72 and 74 and corresponding to the liner sections 70a, 70b, and 70c. The next adjacent holes are separated thin sections of liner 78 that extend longitudinally from the leading edges 82 of the liner cut lines to the trailing edges 84 of the cut lines. The thin liner sections 78 and corresponding liner ties 80 are about ⅛ inch wide but could be larger or smaller depending on the specific requirements of the label, leaving the holes 76 and corresponding liner segments 70 to be about ¾ inch wide, but again could vary in size to meet a variety of specific requirements.

Liner ties 80 effectively minimize the transverse width of the liner holes 76 and help keep the liner cut line leading 82 and trailing edges 84 of the holes 76 in alignment with the balance of the liner as the labels are being automatically dispensed. This helps to keep the leading 82 and trailing 84 cut line edges from binding or getting caught in the label application equipment during the process of applying the label with automated equipment. It has been found that ties such as 80 may not be necessary when the transverse width of the hole in the liner is about ½ inch or less, as in FIG. 1. Of course, depending on the size of the removable strip and overall size of the label, any number of ties and various sizes of ties may be required.

FIG. 4 also illustrates that the liner cut line leading edges 82 are non-linear. The trailing edges 84 of the liner cut lines may or may not be linear and can be spaced about ⅛ inch from the trailing edge of the removable strip 60. In FIG. 4, the cut line leading edge is cone or dome shaped. This shape helps to keep the cut in the liner leading edge 82 from tearing during the label application process. Numerous other non-linear leading edge shapes may be used as well, such as a wedge shape.

Figure 5:
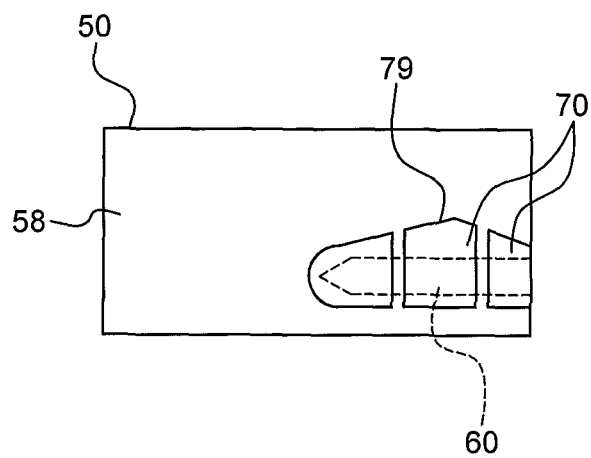
FIG. 5 is a plan view of a label of FIG. 2 after removal from the liner.

FIG. 5 illustrates a label 50 of FIG. 2 after removal from the liner roll. FIG. 5 shows the bottom surface 58 of label 50 coated with a pressure sensitive adhesive. Liner portions 70 having domed, cone or wedge shaped leading edges 79 remain adhered to the bottom surface 58 covering a significant portion of the removable strip 60. The liner portions 70 retain the removable strip 60 section on the label until the removable strip is intentionally removed from the package to which the label 50 is applied.

The descriptions of specific embodiments of the invention herein are intended to be illustrative and not restrictive. The invention may be practiced otherwise than as specifically explained and illustrated without departing from its spirit or scope as defined by the appended claims.

What is claimed is:

1. A label roll having a length and a width, the label roll comprising:
    a label having a top surface and a bottom surface, the bottom surface being coated with an adhesive, the label including a removable strip extending transverse to the label roll length, and
    a liner adhered to the bottom surface of the label by the adhesive, the liner comprising a removable liner portion substantially surrounding the removable strip, the liner further comprising transverse cuts, the cuts extending generally parallel to the length of the label roll, the cuts extending across the removable liner portion for providing a plurality of liner ties across the removable strip, the liner ties defining at least three removable liner portion sections,
    whereby the bottom surface of the removable strip has a plurality of sections exposed to adhesive when the label is removed from the liner, the exposed sections corresponding to the liner ties.

2. A label roll as defined in claim 1 wherein the removable strip has an elongated configuration, the removable strip having a strip width and strip length longer than the strip width, the strip length extending transverse to the label roll length, wherein the transverse cuts extend transverse to the removable strip length.

3. A label as defined in claim 2 wherein the liner ties are generally equally spaced along the length of the removable strip.

4. A label roll as defined in claim 1 wherein the label has an edge and wherein the removable strip extends from the label edge.

5. A label as defined in claim 1 wherein the bottom surface of the label is coated with a pressure sensitive adhesive.

\* \* \* \* \*